Oct. 31, 1961 W. G. DILWORTH 3,006,698
BEARING ASSEMBLY
Filed Nov. 25, 1959

INVENTOR.
William G. Dilworth
BY
J. L. Carpenter
ATTORNEY

# United States Patent Office 3,006,698
Patented Oct. 31, 1961

3,006,698
BEARING ASSEMBLY
William G. Dilworth, La Grange, Ill., assignor to General Motors Corporation, Detroit, Mich., a corporation of Delaware
Filed Nov. 25, 1959, Ser. No. 855,301
4 Claims. (Cl. 308—23)

This invention relates generally to bearing assemblies and more particularly to bearing assemblies in which the bearing assembly is subjected to cyclically variable loading, as for example, the loading applied between a connecting rod of an internal combustion engine and a piston carrier or the piston itself. In such applications it is necessary to provide large bearing areas and ample lubrication for peak and near peak loading of the bearing whereas when the bearing is lightly loaded, small bearing areas and nominal lubrication will suffice.

I have found that hydrodynamic lubrication conditions can be induced into a journal bearing assembly subjected to a unidirectional but fluctuating load by separating either the bearing or the journal into a primary section and a secondary section. The latter is forced by a spring preload into a position where it alone carries the load on the bearing assembly at all values below some perdetermined value. The primary section is moved away from its mating surface by the motion of the secondary section and the preload of the spring allowing the primary section to be covered with a thick film of oil. Then when the load varies cyclically toward its peak value the force of the load overcomes the spring preload and moves the secondary section in the direction of loading allowing the primary section to engage its mating surface. The peak loads are then supported by oil film pressure due to the squeeze action of the primary section and its mating surface on the oil therebetween. When the load value falls below that required to overcome the spring preload, the secondary section and the spring preload again force the primary section away from its mating surface, allowing it to become oiled again.

It is, therefore, an object of this invention to provide a composite bearing assembly including a bearing and a journal, one of which has primary and secondary sections being forced in opposite directions by a preloaded spring force so that the bearing load is carried for a certain value of load below a predetermined value by only one of the bearing elements and above such value by both bearing elements and an oil film between the main bearing element and the other load carrying surface of the bearing assembly.

It is another object of this invention to utilize a special hollow pin of spring material for such purpose. For these and other objects reference may be made to the accompanying description taken in conjunction with the drawings in which:

FIGURE 1 is a sectional view in elevation, certain parts of which are broken away showing the lower portion of an internal combustion engine cylinder and the upper end of a connecting rod pivotally connected together by means of a composite wrist pin bearing assembly which forms the subject of this invention. FIGURE 1 further illustrates the condition of the bearing assembly when the loading on the bearing assembly is relatively low.

Figure 1:
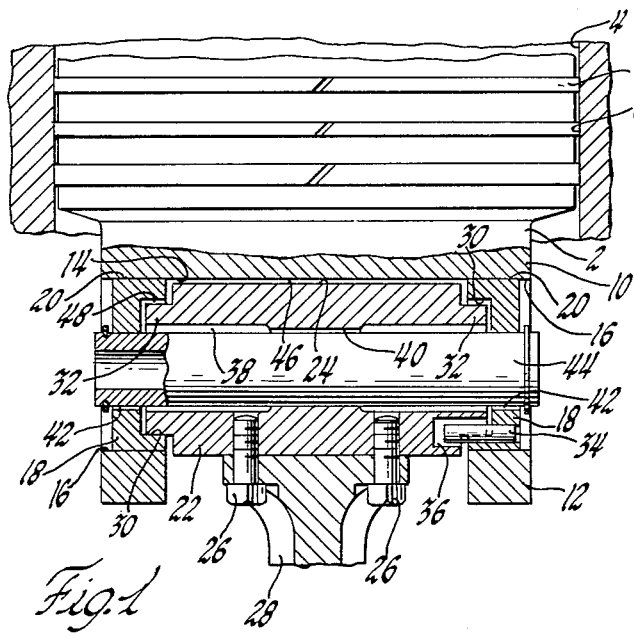
Figure 3:
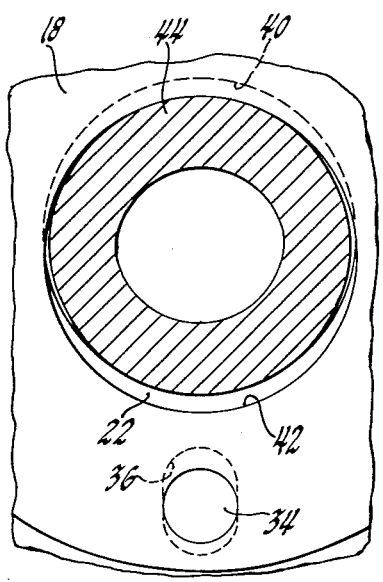
FIGURE 3 is a view taken along the line 3—3 of FIGURE 2 and illustrates the construction and operation of the hollow pin spring acting between the primary and secondary elements of the bearing.
Figure 2:
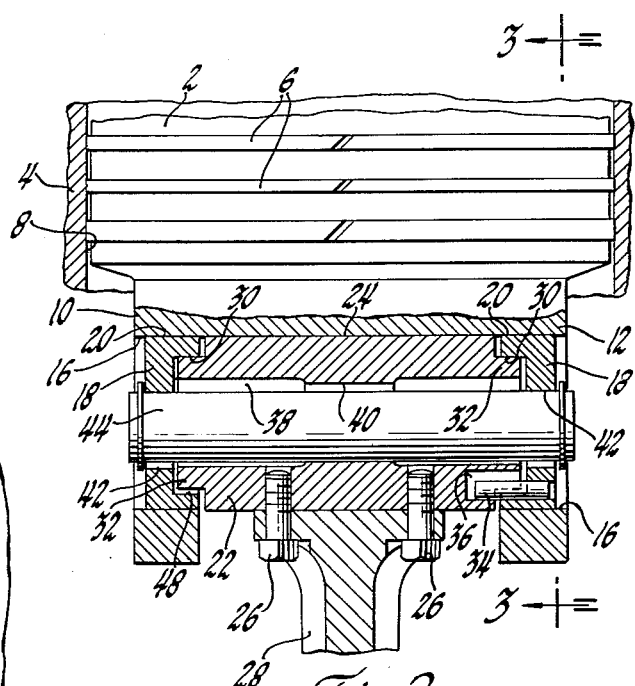
FIGURE 2 is a view similar to that of FIGURE 1 but with the load on the bearing assembly being relatively high.

Referring now to the drawing, a piston 2 is shown reciprocable in an internal combustion engine cylinder 4. The piston may be provided with the usual oil rings 6 engaging the inner wall 8 of cylinder 4. Connected to the lower end 10 of piston 4 is a journal 12 which includes an upper cylindrical bearing surface 14. The journal 12 includes bores 16 in which are inserted a pair of axially spaced secondary washer-like bearing elements 18. The secondary bearing elements 18 are provided with upper cylindrical bearing surfaces 20 which are in mating engagement with the cylindrical bearing surface 14 of the journal 12. Interposed between the secondary bearing elements 18 is a primary bearing element 22 which is also provided with a cylindrical bearing surface 24 adapted to engage the cylindrical bearing surface 14 of journal 12. Fixed to the lower part of the outer surface of primary element 22 by studs 26 is the upper end of a connecting rod 28. The secondary bearing elements 18 are bored out as indicated at 30 in order to receive turned-down portions 32 to support the primary bearing element 22 therein. In order to prevent rotation of the primary bearing element with respect to the secondary bearing elements 18 supporting the primary bearing element, one or more pins 34 are provided in the secondary bearing elements which reside in slots 36 provided in the primary bearing element at the lower side thereof (see particularly FIGURES 1 and 3). The primary bearing element 22 includes a central bore 38 having a reduced cylindrical portion 40 intermediate the ends thereof. A hollow pin 44 of spring-like material extends through bores 42 in the secondary bearing elements and also the bore 38 including the reduced portion 40 of the primary bearing element 22. The hollow pin 44, when inserted in the aforementioned manner, however, is preloaded so that it is distorted into an elliptical shape by making the diametrical distance between the lower side of the reduced bore portion 40 and the upper side of the bores in the secondary bearing elements 18 less than the free outer diameter of the pin 44; i.e., vertically offsetting the axes of bores 42 and bore 38. By preloading the hollow pin 44 in the manner described, the primary element 22 is forced toward the lower sides of the secondary elements 18 so that the upper surface 24 of the primary element 22 is forced away from the surface 14 on journal 12, thereby forming a lubricant cavity 46.

The operation of the composite bearing assembly is as follows:

As already mentioned, because the through bores in the end sections or elements 18 are offset downward, the hollow pin spring 44 is constrained into an elliptical shape during assembly. Thus, the assembly has a spring preload. If now the bearing assembly is loaded sufficiently to overcome the preload of the spring 44 so as to make the spring further elliptical, the bearing surfaces 24 and 14 will move together "squeezing" the lubricant therebetween, thereby providing larger and better lubricated bearing surfaces during heavy bearing loads when sufficient bearing surface and proper lubrication is most needed. Since, as in the case of piston operation, the load on the bearing assembly is cyclical; that is, it is alternately relatively low and builds up gradually to peaks, there will be constant variation in the clearance of space between the surfaces 14 and 24 providing the previously described "squeezing" and filling action of the lubricant cavity 46. The relative movements of the primary and secondary elements 22 and 18 are determined by the clearances 46 and 48.

I claim:

1. A composite bearing assembly for cyclically variable loads comprising a bearing and a journal, said bearing including a secondary bearing element having a bearing surface held in engagement with the bearing surface on said journal, said bearing including a primary bearing element having a bearing surface adapted to engage the bearing surface on said journal and supported by said secondary bearing element, a preloaded spring acting between said elements to space the bearing surface of said primary element away from the bearing surface of said journal for all values of load on the bearing assembly below a predetermined value, the bearing surface on said primary element being engageable with the bearing surface on said journal when the load on said bearing assembly exceeds said predetermined value to overcome the preload on said spring.

2. The combination set forth in claim 1 in which said preload spring is in the form of an elastic hollow tube extending through both said primary and secondary elements and which engages said primary and secondary elements at diametrically opposed locations on said tube.

3. A composite bearing assembly for variable loads comprising a bearing and a journal, said bearing including a pair of axially spaced secondary cylindrical bearing elements having cylindrical bearing surfaces held in engagement with a cylindrical bearing surface on said journal, said bearing including a primary cylindrical bearing element interposed between said secondary bearing elements and having a cylindrical bearing surface adapted to engage the bearing surface on said journal and supported by said secondary bearing elements, a preloaded spring acting between said secondary elements and said primary element to space the bearing surface of said primary element away from the bearing surface of said journal for all values of load on the bearing assembly below a predetermined value to thereby form a lubricant cavity between the bearing surfaces of said journal and said primary element, the bearing surface on said primary element being engageable with the bearing surface on said journal when the load on said bearing assembly exceeds said predetermined value to overcome the preload on said spring whereby lubricant which may be supplied to said cavity may periodically flow between the bearing surfaces on said primary element and said journal during certain periods of the cyclical loading of said assembly.

4. The combination set forth in claim 3 in which said preload spring is in the form of an elastic hollow tube extending through both said secondary elements and said primary element and which engages said primary element and said secondary elements at diametrically opposed locations on said tube.

References Cited in the file of this patent
UNITED STATES PATENTS 2,554,992     Kurtz _____ May 29, 1951